(12) United States Patent
Raghavan (10) Patent No.: US 7,218,895 B1
(45) Date of Patent: May 15, 2007

(54) SYSTEM, METHOD, AND APPARATUS FOR TESTING VOICE QUALITY IN A COMMUNICATION NETWORK

(75) Inventor: Jayasimha M. Raghavan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 541 days.

(21) Appl. No.: 10/294,931

(22) Filed: Nov. 14, 2002

(51) Int. Cl.
*H04B 17/00* (2006.01)

(52) U.S. Cl. .................. 455/67.13; 455/69; 455/67.11; 455/67.14; 455/425; 370/466; 370/389; 370/400; 709/249; 709/223; 709/236; 348/97; 348/441

(58) Field of Classification Search .............. 455/69, 455/67.3, 63.1, 428, 425, 67.11, 67.14; 370/401, 370/402, 351; 709/249, 223, 236; 380/249
See application file for complete search history.

(56) References Cited

U.S. PATENT DOCUMENTS

| | | | |
|---|---|---|---|
| 5,923,662 A * | 7/1999 | Stirling et al. ............... 370/432 |
| 6,016,318 A * | 1/2000 | Tomoike ...................... 370/401 |
| 6,018,657 A * | 1/2000 | Kennedy et al. ......... 455/426.1 |
| 6,091,951 A * | 7/2000 | Sturniolo et al. ........ 455/432.2 |
| 6,230,005 B1 * | 5/2001 | Le et al. .................. 455/414.1 |
| 6,297,845 B1 * | 10/2001 | Kuhn et al. ................. 348/192 |
| 6,449,259 B1 * | 9/2002 | Allain et al. ................. 370/253 |
| 6,748,433 B1 * | 6/2004 | Yaakov ....................... 709/224 |
| 6,775,240 B1 * | 8/2004 | Zhang et al. ................ 370/251 |
| 6,785,513 B1 * | 8/2004 | Sivaprakasam ............ 455/63.1 |
| 6,819,924 B1 * | 11/2004 | Ma et al. ..................... 455/425 |
| 6,856,802 B1 * | 2/2005 | Kinnunen et al. .......... 455/425 |
| 6,909,894 B1 * | 6/2005 | Kingsley et al. ............ 455/423 |
| 6,931,022 B1 * | 8/2005 | Sanders et al. ............. 370/442 |

OTHER PUBLICATIONS

ITU-T. G.729 standard, "Coding of Speech at 8 kbit/s Using Conjugate-Structure Algebraic-Code-Excited Linear-Prediction (CS-ACELP)", Mar. 1996.
ITU-T P.861 standard, "Objective quality measurement of telephone-band (300-3400 Hz) speech codecs", Feb. 1998.
ITU-T P.862 standard, "Perceptual evaluation of speech quality (PESQ): An objective method for end-to-end speech quality assessment of narrow-band telephone networks and speech codecs", Feb. 2001.
ITU-T H.323 standard, "Packet-based multimedia communications systems", Nov. 2000.

* cited by examiner

*Primary Examiner*—Marceau Milord
(74) *Attorney, Agent, or Firm*—Baker Botts L.L.P.

(57) ABSTRACT

A method includes receiving one or more test signals at a first gateway from a second gateway. The method also includes comparing the one or more test signals to one or more expected signals. In addition, the method includes generating a score representing a voice quality supported by the first gateway on a path from the first gateway to the second gateway. The score is based at least partially on the comparison.

47 Claims, 3 Drawing Sheets

SYSTEM, METHOD, AND APPARATUS FOR TESTING VOICE QUALITY IN A COMMUNICATION NETWORK

TECHNICAL FIELD

This disclosure relates generally to communication systems, and more particularly to a system, method, and apparatus for testing voice quality in a communication network.

BACKGROUND

A typical packet-based communication network can support voice communication sessions between two or more participants. For example, the network could support a voice telephone call or a facsimile transmission by transporting Internet Protocol (IP) packets between a client used by a calling party and a client used by a called party. The quality of service or "QoS" supported in the network often determines whether an acceptable voice communication session can occur across the network. For example, if the network supports only a low quality of service, the participants in a telephone call may notice a substantial amount of disruption in the call.

SUMMARY

This disclosure describes a system, method, and apparatus for testing voice quality in a communication network.

In one embodiment, a method includes receiving one or more test signals at a first gateway from a second gateway. The method also includes comparing the one or more test signals to one or more expected signals. In addition, the method includes generating a score representing a voice quality supported by the first gateway on a path from the first gateway to the second gateway. The score is based at least partially on the comparison.

In a particular embodiment, the method further includes communicating the one or more test signals from the first gateway to the second gateway. The second gateway is operable to receive the one or more test signals and to communicate the one or more test signals back to the first gateway. In another particular embodiment, the one or more test signals represent one or more first test signals, and the score represents a first score. The method further includes receiving one or more second test signals from the second gateway and communicating the one or more second test signals to the second gateway. The second gateway is operable to use the one or more second test signals to generate a second score.

In another embodiment, a method includes receiving one or more test signals at a first gateway from a second gateway. The method also includes communicating the one or more test signals back to the second gateway. In addition, the method includes allowing the second gateway to generate a score representing a voice quality supported by the second gateway on a path from the second gateway to the first gateway.

In a particular embodiment, the one or more test signals represent one or more first test signals, and the score represent a first score. The method further includes generating one or more second test signals at the first gateway, communicating the one or more second test signals to the second gateway, and receiving the one or more second test signals at the first gateway from the second gateway. The method also includes comparing the one or more second test signals to one or more expected signals and generating a second score. The second score represents a voice quality supported by the first gateway on the path from the first gateway to the second gateway. The second score is based at least partially on the comparison.

One or more technical features may be provided according to various embodiments of this disclosure. Particular embodiments of this disclosure may exhibit none, some, or all of the following features depending on the implementation. For example, in one embodiment, gateways in a communication network may communicate with and test one another. During a test, a first gateway communicates information to a second gateway. The second gateway receives the information and communicates the information back to the first gateway. The first gateway receives the information from the second gateway and determines a score that represents the voice quality supported by the first gateway on a path from the first gateway to the second gateway. The score can then be used to make adjustments to the network. As an example, a network administrator or other personnel can use the scores to make adjustments to improve the quality of service supported by the network. By allowing the gateways to monitor and test one another, this may help to reduce the workload placed on the network administrator, such as by reducing the need for the administrator to test each gateway individually. This may also allow the gateways to monitor the condition of the network as the condition changes over time.

Other features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION OF EXAMPLE EMBODIMENTS

Figure 1:
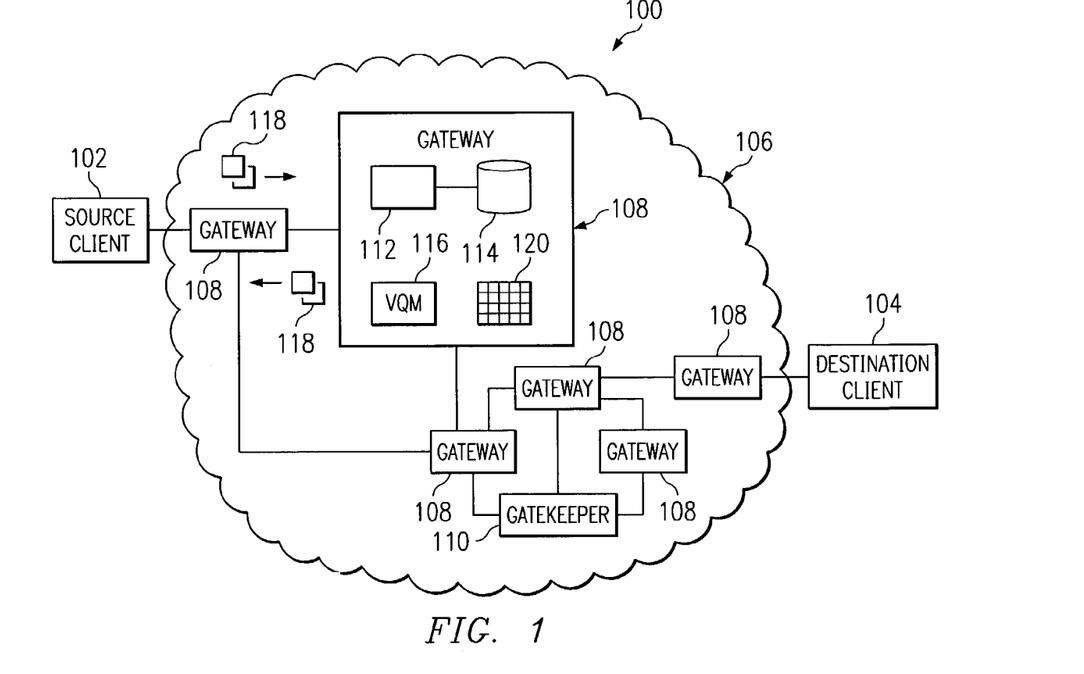
FIG. 1 illustrates an example communication system.

FIG. 1 is a block diagram illustrating an example communication system 100. In the illustrated embodiment, system 100 includes one or more source clients 102, one or more destination clients 104, and a network 106. Other embodiments of system 100 may be used without departing from the scope of this disclosure.

In one aspect of operation, network 106 includes one or more gateways 108. To help network 106 maintain a suitable quality of service for voice communications, at least some of the gateways 108 communicate with one another and test each other. For example, during a test, a transmitting gateway 108 communicates information such as audio signals to a receiving gateway 108. The receiving gateway 108 receives the information and communicates the information back to the transmitting gateway 108. The transmitting gateway 108 receives the information and determines a score based on the received information. The score represents the voice quality supported by the transmitting gateway 108 on a path from the transmitting gateway 108 to the receiving gateway 108. The score can then be used to adjust the operational parameters of network 106. For example, the score can be provided to a network administrator or other personnel who can make the adjustments to the network 106.

In the illustrated example, source client 102 is coupled to network 106. In this specification, the term "couple" refers to any direct or indirect physical, logical, virtual, or other types of communication between two or more components, whether or not those components are in physical contact with one another. Source client 102 operates to establish communication sessions in system 100. For example, source client 102 could allow a user to place a telephone call to a destination client 104. Source client 102 could also establish a session allowing the user to communicate facsimile, data, or other traffic through system 100. Source client 102 may include any hardware, software, firmware, or combination thereof for providing one or more communication services to a user. In one embodiment, source client 102 represents a voice over packet client such as a Voice over Internet Protocol (VoIP) client, an International Telecommunication Union—Telecommunications (ITU-T) H.323 client, a fixed telephone, a wireless telephone, a facsimile machine, a computing device, or any other communication device.

Destination client 104 is coupled to network 106. Destination client 104 represents the destination of the voice, facsimile, data, or other traffic communicated from source client 102. Destination client 104 may include any hardware, software, firmware, or combination thereof for receiving one or more types of communication traffic from source client 102. Destination client 104 could, for example, represent a VoIP client, an H.323 client, a fixed or wireless telephone, a facsimile machine, a computing device, or any other communication device.

Network 106 facilitates communication between components coupled to network 106. For example, network 106 may communicate datagrams containing voice information between network addresses. A datagram represents an Internet Protocol (IP) packet, a frame relay frame, an Asynchronous Transfer Mode (ATM) cell, or any other suitable segment of information. Although system 100 may be described in various places in this specification as generating and processing IP packets, other types of datagrams could be used. Network 106 may include one or more local area networks (LANs), metropolitan area networks (MANs), wide area networks (WANs), all or a portion of a global network such as the Internet, or any other communication system or systems at one or more locations.

Figure 2:
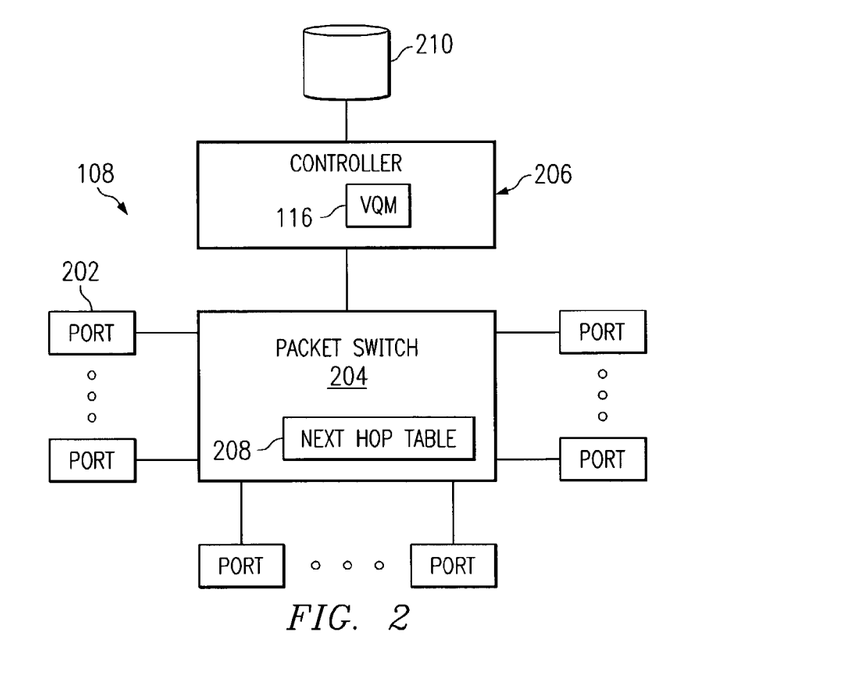
FIG. 2 illustrates an example gateway.

In the illustrated example, network 106 includes gateways 108 and a gatekeeper 110. Gateway 108 represents a network node that facilitates the communication of datagrams through network 106. Gateways 108 may represent routers, edge devices, hubs, bridges, proxies, firewalls, switches, remote access devices, or any other communication devices. One example of a gateway is shown in FIG. 2, which is described below. Gateway 108 may include any hardware, software, firmware, or combination thereof for supporting communication in network 106. Gateway 108 may, for example, include one or more processors 112 and one or more memories 114, which may store instructions executed by processor 112 and data processed by processor 112.

Gatekeeper 110 performs call routing functions in system 100. For example, a source client 102 served by a first gateway 108 may attempt to communicate with a destination client 104. The first gateway 108 checks whether it serves the destination client 104 or can otherwise handle the call without the use of gatekeeper 110. If so, the first gateway 108 communicates with the destination client 104 to establish a communication session between the source client 102 and the destination client 104. Otherwise, the first gateway 104 communicates with gatekeeper 110, and gatekeeper 110 informs the first gateway 108 that a second gateway 108 serves the destination client 104. The first gateway 108 then communicates with the second gateway 108 to establish a communication session between the source client 102 and the destination client 104. Gatekeeper 110 may include any hardware, software, firmware, or combination thereof for supporting call routing in system 100.

In one aspect of operation, each of one or more gateways 108 includes a voice quality module (VQM) 116. Voice quality module 116 allows one gateway 108 to test the voice quality supported along paths to other gateways 108 in system 100. For example, the voice quality module 116 in a first gateway 108 causes the first gateway 108 to communicate datagrams 118 containing audio information to a second gateway 108. In one embodiment, the datagrams 118 contain one or more tones at one or more frequencies. In a particular embodiment, tones at three different frequencies (104 Hz, 1004 Hz, and 2804 Hz) are encapsulated in fifty datagrams 118 each, and the gateways 108 use the ITU-T g729r8 codec to encode and decode the audio information in the datagrams 118. Also, in a particular embodiment, the datagrams 118 are sent to User Datagram Protocol (UDP) port 32760 of the receiving gateway 108 in a Realtime Transport Protocol (RTP) stream.

The second gateway 108 receives the datagrams 118 and communicates the datagrams 118 back to the first gateway 108. The first gateway 108 receives the datagrams 118 and passes the datagrams 118 to the voice quality module 116 in the first gateway 108. The voice quality module 116 analyzes the audio information contained in the received datagrams 118, such as by depacketizing the information in the datagrams 118 to generate audio signals and by comparing the frequency pattern of the audio signals to an expected frequency pattern. Based on the analysis, the voice quality module 116 generates a score representing the voice quality supported by the first gateway 108 on a path from the first gateway 108 to the second gateway 108. For example, the score may indicate how well the tones in the received datagrams 118 match the expected pattern. In a particular embodiment, the score is based on the ITU-T P.861 (Perceptual Speech Quality Measurement or "PSQM") and/or P.862 (Perceptual Evaluation of Speech Quality or "PESQ") standards. The process may then repeat itself with the second gateway 108 generating and communicating datagrams 118 to the first gateway 108 and the first gateway 108 sending the datagrams 118 back to the second gateway 108.

Figure 3:
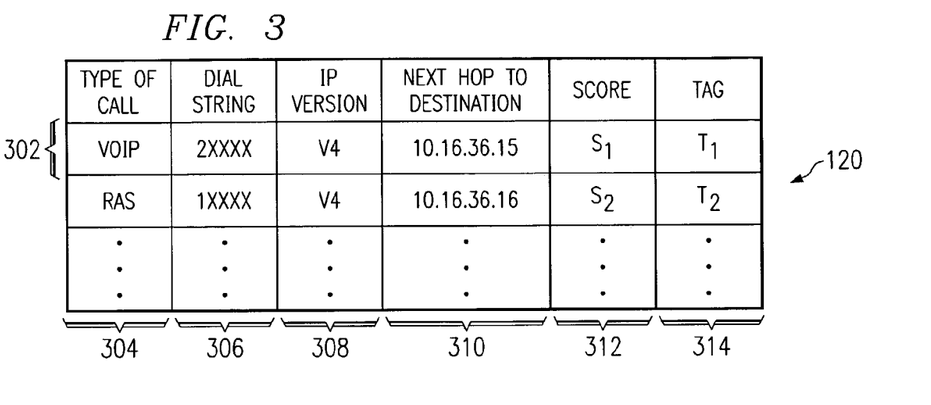
FIG. 3 illustrates an example voice quality table.

The first and/or second gateways 108 may store the generated scores in a voice quality table 120. Table 120 could store any other suitable information, such as the network addresses of the gateways 108 associated with the scores. One example of a voice quality table 120 is shown in FIG. 3, which is described below. The information in table 120 could be used in any suitable manner in system 100. For example, voice quality module 116 could make the information in table 120 available to a user, such as a system administrator or network engineer, for use in adjusting the operational parameters of network 106. Voice quality module 116 could also make the information available to an automated tool that adjusts the operational parameters of network 106.

The voice quality module 116 in a gateway 108 may initiate a test at any suitable time. For example, voice quality module 116 could initiate the test during initialization of the gateway 108 or in response to a user's command. The test could also be initiated after a specified amount of time has elapsed or at specified intervals of time. The command, specified amount of time, or specified interval can be supplied to voice quality module 116 through a command line interface (CLI), using a Simple Network Management Protocol (SNMP) command, or in any other suitable manner. If SNMP is used, gateway 108 may include a Message Information Base (MIB) supporting the use of SNMP.

Voice quality module 116 may include any hardware, software, firmware, or combination thereof operable to test the voice quality supported by one or more gateways 108 in system 100. As a particular example, voice quality module 116 could represent one or more software routines executed by processor 112 in a gateway 108.

Although FIG. 1 illustrates one example of a system 100 for testing voice quality, various changes may be made to system 100. For example, while FIG. 1 illustrates two clients 102, 104, system 100 could include any suitable number of clients. Also, a client 102, 104 could act as a source client during one communication session and as a destination client during another communication session. Further, the arrangement and composition of network 106 is for illustration only. Networks having other configurations and/or different components could also be used. Beyond that, while FIG. 1 illustrates gateways 108 residing in a single network 106, gateways 108 could reside in multiple networks 106. In addition, gateways 108 have been described as performing bi-directional tests, where two gateways 108 test each other. Gateways 108 could also participate in a uni-directional test, where the first gateway 108 generates datagrams 118 and sends the datagrams 118 to the second gateway 118, and the second gateway 108 sends the datagrams 118 back to the first gateway 108 so the first gateway 108 can generate the score.

FIG. 2 illustrates an example gateway 108. In the illustrated embodiment, gateway 108 includes ports 202, a packet switch 204, and a controller 206. In this embodiment, gateway 108 represents a router in system 100 of FIG. 1. Other embodiments of gateway 108 may be used without departing from the scope of this disclosure.

Each port 202 is coupled to packet switch 204. Port 202 represents an interface allowing gateway 108 to communicate with other components of system 100. For example, a port 202 may be coupled to a source client 102, a destination client 104, another gateway 108, or a gatekeeper 110. Port 202 may represent any suitable structure or structures facilitating communication with one or more components of system 100.

Packet switch 204 is coupled to ports 202 and controller 206. Packet switch 204 facilitates communication between different ports 202 in gateway 108. For example, packet switch 204 may receive a datagram through one port 202 and forward the datagram to another port 202 for delivery to a destination. As a particular example, to identify which port 202 should receive the datagram for delivery to the destination, packet switch 204 may use a next hop table 208. Next hop table 208 identifies different possible destinations in network 106, such as different clients 102, 104 in system 100. For each possible destination, next hop table 208 identifies the port 202 to be used to forward the datagram to the next hop in a path leading to the destination. The next hop represents another component in network 106, such as another gateway 108. When packet switch 204 receives a datagram over one port 202, packet switch 204 identifies the destination of that datagram. Packet switch 204 then accesses next hop table 208, identifies the port 202 associated with the identified destination, and routes the datagram to the identified port 202. Packet switch 204 may include any hardware, software, firmware, or combination thereof for facilitating the communication of datagrams between ports 202.

Controller 206 is coupled to packet switch 204. Controller 206 controls and manages the operation of gateway 108. For example, controller 206 may determine that a particular component of network 106 can no longer be used to deliver datagrams to a particular destination. This may occur, for example, when another gateway 108 in network 106 suffers a power failure or is damaged. When this occurs, controller 206 updates next hop table 208 to show that the inoperable gateway 108 cannot be used to route information to a particular destination. Controller 206 could then identify a different gateway 108 to use for routing information to that particular destination. Controller 206 may include any hardware, software, firmware, or combination thereof for managing gateway 108. Controller 206 may, for example, include one or more digital signal processors (DSPs).

In one aspect of operation, controller 206 may include voice quality module 116. Voice quality module 116 may, for example, represent one or more software routines executed by controller 206. In this embodiment, voice quality module 116 may allow gateway 108 to test the voice quality supported along paths to other gateways 108 in system 100. For example, voice quality module 116 may generate one or more tones at one or more frequencies. Voice quality module 116 also generates one or more datagrams containing a digitized version of the tones. As a particular example, voice quality module 116 may use the ITU-T g729r8 codec to digitize the tones. Controller 206 communicates the generated datagrams to packet switch 204, which forwards the datagrams to a port 202 for communication to a receiving gateway 108. The receiving gateway 108 receives the generated datagrams and sends the datagrams back to the transmitting gateway 108. The voice quality module 116 in the transmitting gateway 108 receives the datagrams through a port 202 and switch 204 and generates a score representing the voice quality supported by the transmitting gateway 108 on a path from the transmitting gateway 108 to the receiving gateway 108. The transmitting gateway 108 may then update a voice quality table 120 and communicate the score to the receiving gateway 108. A voice quality module 116 in the receiving gateway 108 may receive and store the score in another voice quality table 120. This process can then be repeated, where the receiving gateway 108 from the first test becomes the transmitting gateway 108 in the second test.

Voice quality module 116 has been described as generating, packetizing, and communicating audio signals to perform a voice quality test. Voice quality module 116 could use any other suitable technique to generate and/or communicate test signals to another gateway 108. In this specification, the phrase "test signal" refers to any audio or other signal having a frequency pattern that can be compared to an expected pattern to test the voice quality supported by one or more gateways 108. For example, voice quality module 116 could pre-generate and store datagrams containing audio signals in a memory 210. When a voice quality test is initiated, voice quality module 116 could retrieve the datagrams from memory 210 and use the datagrams during the test.

Although FIG. 2 illustrates one example of a gateway 108, various changes may be made to FIG. 2. For example, while FIG. 2 illustrates gateway 108 as a router, gateway 108 could represent any other suitable communication device in network 106. Also, the gateway 108 illustrated in FIG. 2 has been simplified for ease of illustration and explanation.

Components can be combined or omitted and additional components can be added to gateway 108 according to particular needs. Further, any other suitable type of router could be used as a gateway 108 in system 100. In addition, voice quality module 116 could represent a separate component in gateway 108 and need not form part of controller 206.

FIG. 3 illustrates an example voice quality table 120. In the illustrated embodiment, table 120 includes one or more entries 302, each entry 302 containing information about a voice quality test in system 100 of FIG. 1. The table 120 shown in FIG. 3 is for illustration only. Other embodiments of table 120 could be used without departing from the scope of this disclosure.

In the illustrated example, each entry 302 identifies the type of call 304 associated with a voice quality test in system 100. In one embodiment, gateway 108 uses different types of communication sessions to transport the datagrams to another gateway 108. As a particular example, gateway 108 may or may not need to consult with gatekeeper 110 to establish the communication session. If gateway 108 does not need to consult gatekeeper 110 to establish the communication session, the communication session may be identified as a "VoIP" type of call 304. If gateway 108 consults with gatekeeper 110 to establish the communication session, the communication session may be identified as a "RAS" (Registration, Admission, and Status) type of call 304. Other or additional types of calls 304 could also be supported in system 100.

Dial string 306 identifies a dialing plan used by one or more gateways 108 in system 100. For example, a dialing plan may represent the telephone numbers assigned to clients 102, 104 of a gateway 108, where the telephone numbers include a common prefix number or numbers. As shown in FIG. 3, system 100 could include a 1xxxx dialing plan and a 2xxxx dialing plan. The 2xxxx dialing plan can be reached by a gateway 108 associated with table 120 without using gatekeeper 110, while the 1xxxx dialing plan is reached using gatekeeper 110. System 100 could include one or multiple dialing plans to represent the telephone numbers or other identifiers assigned to clients 102, 104.

IP version 308 identifies the version of the Internet Protocol used to communicate with a particular gateway 108 in system 100. Next hop 310 identifies the network address to be used when communicating datagrams destined for a gateway 108. For example, next hop 310 may represent the network address of the gateway 108 or of a component in the path toward the gateway 108. When a transmitting gateway 108 initiates a test of a receiving gateway 108, the transmitting gateway 108 may use the network address identified by the next hop 310 in an entry 302 to communicate with the receiving gateway 108.

Scores 312 represent the voice quality supported along paths to other gateways 108 in system 100. Scores 312 could, for example, represent ITU-T PSQM/PESQ scores generated by voice quality module 116 in one or more gateways 108. Gateways 108 may generate scores 312 at any suitable time, such as in response to a triggering event. The triggering event could represent a command from a user, a defined amount of time elapsing, or any other suitable triggering event. Gateways 108 could also recompute scores 312 at given intervals of time, which allows voice quality modules 116 to more dynamically measure the voice quality supported in system 100. As a result, even as conditions in network 106 change, voice quality modules 116 could allow a network administrator or other personnel to identify the condition of the network 106.

Tags 314 uniquely identify each entry 302 in table 120. Tags 314 may be useful, for example, in exchanging information about table 120 between gateways 108. For example, gateways 108 could communicate with one another and exchange summaries of table 120 at specified intervals of time. Each summary could include the tags 314 and scores 312 from entries 302. This allows the gateways 108 to communicate with each other and update the scores 312 in tables 120, without requiring an entire table 120 to be exchanged. In other embodiments, the entire table 120 could be exchanged between gateways 108. Also, tags 314 could uniquely identify each entry 302 in table 120, which may allow tags 314 to be used to access and modify the table 120.

Although FIG. 3 illustrates one example of a voice quality table 120, various changes may be made to FIG. 3. For example, table 120 could include any other or additional information. Also, while FIG. 3 illustrates a table storing the information associated with the voice quality tests, any other suitable data structure or structures can be used to store the information.

Figure 4:
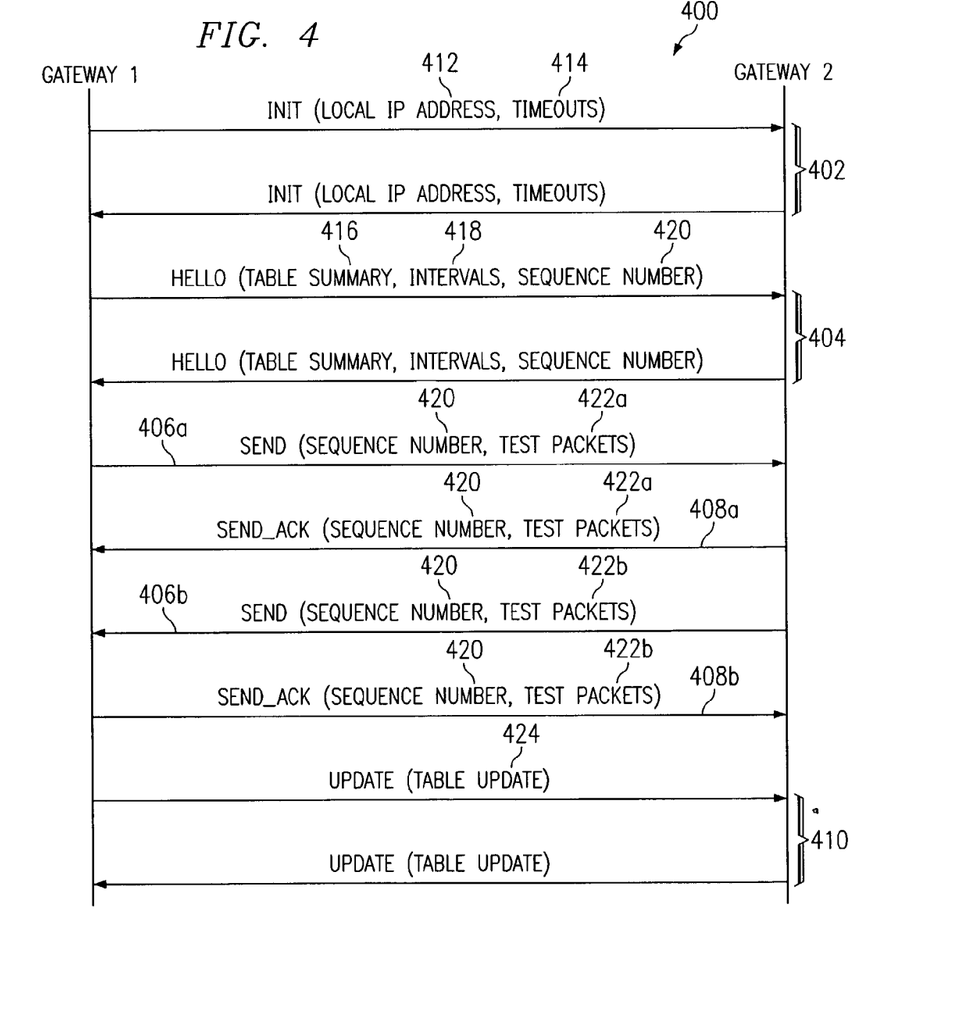
FIG. 4 illustrates example signaling messages for testing voice quality in a communication network.

FIG. 4 illustrates example signaling messages 400 for testing voice quality in a communication network. While signaling messages 400 may be described with respect to gateways 108 in system 100 of FIG. 1, signaling messages 400 could be used by any suitable network component in any suitable system.

To initiate a test of the voice quality supported by gateways 108 in system 100, two gateways 108 may communicate and exchange initialization (INIT) messages 402. An initialization message 402 includes a network address 412 and one or more timeouts 414. Network address 412 identifies the network address of the gateway 108 sending the initialization message 402. A timeout 414 represents a quantity of time that a gateway 108 receiving the initialization message 402 may wait to receive a message from the gateway 108 transmitting the initialization message 402. If a message is not received within the time period defined by a timeout 414, the gateway 108 receiving the initialization message 402 may generate an error and terminate a voice quality test. In a particular embodiment, one timeout 414 defines the quantity of time that the gateway 108 receiving the initialization message 402 should wait to receive a HELLO message 404, and another timeout 414 defines the maximum amount of time that one gateway 108 should wait to receive any message from the other gateway 108.

In response to the initialization messages 402, each gateway 108 communicates a HELLO message 404 to the other gateway 108. The HELLO message 404 includes a table summary 416, one or more intervals 418, and a sequence number 420. Table summary 416 contains a summary of a voice quality table 120 in the gateway 108 transmitting the HELLO message 404, such as the scores 312 and tags 314 from table 120 and a flag for each score 312. The flag identifies whether an associated score 312 has changed since the last HELLO messages 404 were exchanged between gateways 108. Intervals 418 define the intervals at which gateways 108 should communicate particular types of messages to one another. For example, one interval 418 may define the interval at which gateways 108 exchange HELLO messages 404, such as every 180 seconds. Sequence number 420 provides a unique identifier for identifying a particular voice quality test. In one embodiment, a gateway 108 could be involved in multiple voice quality tests with other gateways 108, and sequence number 420 provides a mechanism for associating incoming and outgoing messages with a particular voice quality test.

After exchanging HELLO messages 404, a first of the gateways 108 communicates a SEND message 406a to a second of the gateways 108. The SEND message 406a includes the sequence number 420 associated with the voice quality test and one or more test packets 422a. Test packets 422a contain one or more tones generated by the first gateway 108. The second gateway 108 receives the test packets 422a and communicates the test packets 422a back to the first gateway 108 in a send acknowledgement (SEND_ACK) message 408a. The first gateway 108 may then receive and use the test packets 422a to generate a score representing the voice quality supported by the first gateway 108 along a path between the first gateway 108 and the second gateway 108. The second gateway can then transmit another SEND message 406b to the first gateway 108, and the voice quality test is repeated.

Each gateway 108 could further communicate an UPDATE message 410 to the other gateway 108. An UPDATE message 410 contains a table update 424, which represents a change to the voice quality table 120 maintained at a gateway 108. In one embodiment, the use of UPDATE messages 410 is optional. In this embodiment, an UPDATE message 410 need not be communicated from one gateway 108 to another gateway 108 unless the voice quality score generated during a current test changes from a voice quality score generated during a previous test. In this way, if the voice quality score does not change, an UPDATE message 410 may not be needed in system 100.

Although FIG. 4 illustrates one example of the signaling messages 400 used by gateways 108 during a voice quality test, various changes may be made to FIG. 4. For example, gateways 108 may communicate HELLO messages 404 at a specified interval. If the interval is reached during a test, gateways 108 may exchange additional HELLO messages 404 during the test. Also, any other suitable signaling messages can be used to facilitate voice quality testing of gateways 108. Further, while FIG. 4 shows bi-directional voice quality tests, a uni-directional test could occur where only one gateway 108 generates a SEND message 406. In addition, the use of HELLO messages 404 and/or UPDATE messages 410 may be optional in system 100.

Figure 5:
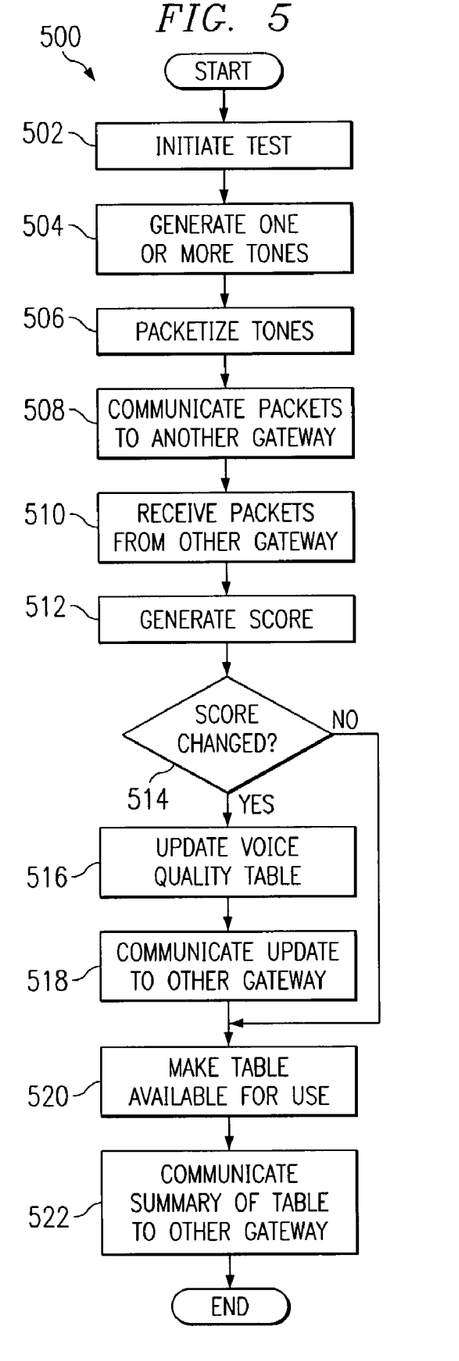
FIG. 5 illustrates an example method for testing voice quality in a communication network at a transmitting gateway.

FIG. 5 illustrates an example method 500 for testing voice quality in a communication network at a transmitting gateway 108. While method 500 may be described with respect to system 100 of FIG. 1, method 500 could also be used by any other suitable system.

A first gateway 108 initiates a voice quality test at step 502. This may include, for example, a voice quality module 116 in the first gateway 108 detecting a triggering event, such as a command from a user or a time interval elapsing. The first gateway 108 generates one or more test signals at step 504. This may include, for example, a voice quality module 116 in the first gateway 108 generating tones at one or more frequencies. In a particular embodiment, this may include voice quality module 116 generating signals at 104 Hz, 1004 Hz and 2804 Hz.

The first gateway 108 packetizes the test signals at step 506. This may include, for example, voice quality module 116 digitizing the signals generated at step 504. In a particular embodiment, this may include voice quality module 116 digitizing the signals using the ITU-T g729r8 codec, which generates 50 datagrams 118 every second per tone. The first gateway 108 communicates the generated packets to a second gateway 108 at step 508. This may include, for example, the first gateway 108 communicating the generated datagrams 118 to UDP port 32760 of the second gateway 108. The first gateway 108 receives the packets from the second gateway 108 at step 510. This may include, for example, the first gateway 108 receiving the datagrams 118 from the second gateway 108 at UDP port 32760. This may also include the first gateway 108 providing the datagrams 118 to the voice quality module 116 in the first gateway 108.

The first gateway 108 generates a score at step 512. This may include, for example, the voice quality module 116 in the first gateway 108 depacketizing and decoding the signals contained in the datagrams 118. This may also include the voice quality module 116 in the first gateway 108 comparing the signals contained in the datagrams 118 to expected test signals, such as by comparing the wave forms of the received signals to expected wave forms. This may further include voice quality module 116 in the first gateway 108 generating a PSQM/PESQ score based on the comparison.

The first gateway 108 determines whether the generated score has changed at step 514. This may include, for example, the voice quality module 116 in the first gateway 108 accessing table 120 and determining whether another voice quality test involving the second gateway 108 was performed earlier. If a previous test was performed, voice quality module 116 identifies the previously generated score and compares that score to the newly generated score. Voice quality module 116 may then determine whether the newly generated score is different from the previous score. Also, if no previous test involving the second gateway 108 was performed, voice quality module 116 may treat the score as having changed from a previous state.

If the score has changed, the first gateway 108 updates the voice quality table 120 in the first gateway 108 at step 516. This may include, for example, voice quality module 116 in the first gateway 108 inserting the newly received score in an entry 302 of voice quality table 120. The first gateway 108 also communicates an UPDATE message 410 to the second gateway 108 at step 518. This allows the second gateway 108 to update its voice quality table 120.

The first gateway 108 makes the voice quality table 120 available for use at step 520. This may include, for example, voice quality module 116 in the first gateway 108 communicating the contents of the voice quality table 120 to a user upon request. This may also include voice quality module 116 in the first gateway 108 communicating the contents of the voice quality table 120 to an automated tool that adjusts the operational parameters of network 106. The first gateway 108 communicates a summary of the voice quality table 120 to the second gateway 108 at step 522. Although FIG. 5 illustrates this step occurring after step 520, the first gateway 108 could communicate a summary of the table 120 to the second gateway 108 at any suitable time. Also, the first gateway 108 could communicate multiple summaries to the second gateway 108, such as by communicating a summary at specified intervals of time.

Although FIG. 5 illustrates one example of a method 500 for testing voice quality in a communication network at a transmitting gateway 108, various changes may be made to method 500. For example, while the first gateway 108 is illustrated as generating packets containing the generated tones, the first gateway 108 could generate any other suitable datagrams. Also, the first gateway 108 need not update the second gateway 108 at step 518 and/or communicate a summary to the second gateway 108 at step 522.

Figure 6:
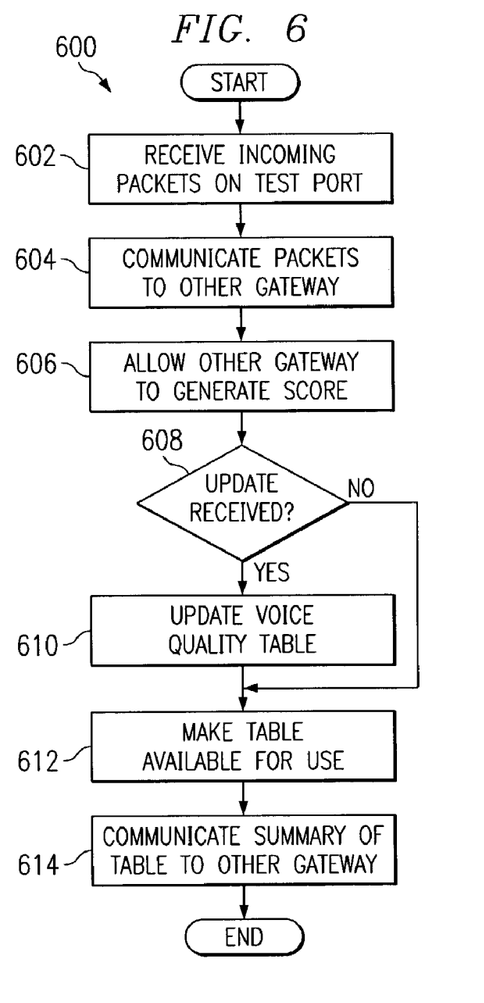
FIG. 6 illustrates an example method for testing voice quality in a communication network at a receiving gateway

FIG. 6 illustrates an example method 600 for testing voice quality in a communication network at a receiving gateway 108. While method 600 may be described with respect to system 100 of FIG. 1, method 600 could also be used in any other suitable system.

A second gateway 108 receives incoming packets on a test port from a first gateway 108 at step 602. This may include, for example, a voice quality module 116 in the second gateway 108 receiving datagrams 118 as part of a SEND message 406. This may also include the receiving gateway 108 receiving the datagrams 118 on UDP port 32760 in an RTP stream. The second gateway communicates the packets back to the first gateway 108 at step 604. This may include, for example, the second gateway 108 communicating the received datagrams 118 to UDP port 32760 of the first gateway 108 in an RTP stream.

The second gateway 108 allows the first gateway 108 to generate a voice quality score at step 606. This may or may not involve the first gateway 108 communicating an UPDATE message to the second gateway 108. If an UPDATE message is received at step 608, the second gateway 108 updates its voice quality table 120 at step 610.

The second gateway 108 makes its voice quality table 120 available for use at step 612. This may include, for example, voice quality module 116 in the second gateway 108 communicating the contents of voice quality table 120 to a user upon request, communicating the contents to an automated tool in system 100, or using the contents in any other suitable manner. The second gateway 108 communicates a summary of the voice quality table 120 to the first gateway 108 at step 614. Although FIG. 6 illustrates this step occurring after step 612, the second gateway 108 could communicate a summary of the table 120 to the first gateway 108 at any suitable time. Also, the second gateway 108 could communicate multiple summaries to the first gateway 108, such as by communicating a summary at specified intervals of time.

Although FIG. 6 illustrates one example of a method 600 for testing voice quality in a communication network at a receiving gateway 108, various changes may be made to method 600. For example, while the second gateway 108 is illustrated as processing packets containing test signals, the second gateway 108 could process any other suitable datagrams. Also, the second gateway 108 may not receive an update message at step 608 and/or communicate a summary to the first gateway 108 at step 614.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   receiving one or more test signals at a first gateway from a second gateway;
   comparing the one or more test signals to one or more expected signals; and
   generating a score representing a voice quality supported by the first gateway on a path from the first gateway to the second gateway, the score based at least partially on the comparison.

2. The method of claim 1, further comprising communicating the one or more test signals from the first gateway to the second gateway, the second gateway operable to receive the one or more test signals and to communicate the one or more test signals back to the first gateway.

3. The method of claim 2, wherein the one or more test signals comprise one or more first test signals and the score comprises a first score; and further comprising:
   receiving one or more second test signals from the second gateway; and
   communicating the one or more second test signals to the second gateway, the second gateway operable to use the one or more second test signals to generate a second score.

4. The method of claim 1, wherein the one or more test signals comprise one or more tones generated and digitized at the first gateway.

5. The method of claim 4, wherein the one or more tones comprise three tones at frequencies of 104 Hertz, 1004 Hertz, and 2804 Hertz.

6. The method of claim 1, wherein the score comprises at least one of an International Telecommunication Union—Telecommunications (ITU-T) Perceptual Speech Quality Measurement (PSQM) score and an ITU-T Perceptual Evaluation of Speech Quality (PESQ) score.

7. The method of claim 1, further comprising storing the score in a table.

8. The method of claim 7, wherein the table comprises a first table; and further comprising communicating the score to the second gateway, the second gateway operable to update a second table with the score.

9. The method of claim 8, wherein:
   the second gateway comprises one of a plurality of second gateways;
   the table comprises a plurality of scores and a plurality of tags, each tag associated with one of the scores in the table; and
   further comprising communicating a summary of the table to at least one of the second gateways, the summary comprising the tags from the table, the scores from the table, and a plurality of flags, each flag identifying whether an associated score has changed since a previous summary of the table was communicated to the at least one second gateway.

10. The method of claim 1, wherein receiving one or more test signals and comparing the one or more test signals to one or more expected signals comprises:
    receiving a plurality of datagrams at the first gateway, the datagrams comprising one or more digitized signals;
    depacketizing the datagrams; and
    decoding the one or more digitized signals to generate the one or more test signals.

11. The method of claim 1, wherein the gateways comprise routers in a packet network.

12. Logic embodied on at least one computer readable medium and operable when executed to:
    receive one or more test signals at a first gateway from a second gateway;
    compare the one or more test signals to one or more expected signals; and
    generate a score representing a voice quality supported by the first gateway on a path from the first gateway to the second gateway, the score based at least partially on the comparison.

13. The logic of claim 12, wherein the logic is further operable to communicate the one or more test signals from the first gateway to the second gateway, the second gateway operable to receive the one or more test signals and to communicate the one or more test signals back to the first gateway.

14. The logic of claim 13, wherein:
    the one or more test signals comprise one or more first test signals and the score comprises a first score; and the logic is further operable to:
  receive one or more second test signals from the second gateway; and
  communicate the one or more second test signals to the second gateway, the second gateway operable to use the one or more second test signals to generate a second score.

15. The logic of claim 12, wherein the one or more test signals comprise one or more tones generated and digitized at the second gateway.

16. The logic of claim 15, wherein the one or more tones comprise three tones at frequencies of 104 Hertz, 1004 Hertz, and 2804 Hertz.

17. The logic of claim 12, wherein the score comprises at least one of an International Telecommunication Union—Telecommunications (ITU-T) Perceptual Speech Quality Measurement (PSQM) score and an ITU-T Perceptual Evaluation of Speech Quality (PESQ) score.

18. The logic of claim 12, wherein the logic is further operable to:
  store the score in a first table; and
  communicate the score to the second gateway, the second gateway operable to update a second table with the score.

19. The logic of claim 18, wherein:
  the second gateway comprises one of a plurality of second gateways;
  the first table comprises a plurality of scores and a plurality of tags, each tag associated with one of the scores in the table; and
  the logic is further operable to communicate a summary of the first table to at least one of the second gateways, the summary comprising the tags from the first table, the scores from the first table, and a plurality of flags, each flag identifying whether an associated score has changed since a previous summary of the first table was communicated to the at least one second gateway.

20. An apparatus, comprising:
  one or more processors collectively operable to:
    receive one or more test signals at a first gateway from a second gateway;
    compare the one or more test signals to one or more expected signals; and
    generate a score representing a voice quality supported by the first gateway on a path from the first gateway to the second gateway, the score based at least partially on the comparison; and
  a memory operable to store the score.

21. The apparatus of claim 20, wherein the one or more processors are further collectively operable to communicate the one or more test signals from the first gateway to the second gateway, the second gateway operable to receive the one or more test signals and to communicate the one or more test signals back to the first gateway.

22. The apparatus of claim 21, wherein:
  the one or more test signals comprise one or more first test signals and the score comprises a first score; and
  the one or more processors are further collectively operable to:
    receive one or more second test signals from the second gateway; and
    communicate the one or more second test signals to the second gateway, the second gateway operable to use the one or more second test signals to generate a second score.

23. The apparatus of claim 20, wherein the one or more test signals comprise one or more tones generated and digitized at the second gateway.

24. The apparatus of claim 23, wherein the one or more tones comprise three tones at frequencies of 104 Hertz, 1004 Hertz, and 2804 Hertz.

25. The apparatus of claim 20, wherein the score comprises at least one of an International Telecommunication Union—Telecommunications (ITU-T) Perceptual Speech Quality Measurement (PSQM) score and an ITU-T Perceptual Evaluation of Speech Quality (PESQ) score.

26. The apparatus of claim 20, wherein the one or more processors are further collectively operable to:
  store the score in a first table in the memory; and
  communicate the score to the second gateway, the second gateway operable to update a second table with the score.

27. The apparatus of claim 20, wherein:
  the second gateway comprises one of a plurality of second gateways;
  the first table comprises a plurality of scores and a plurality of tags, each tag associated with one of the scores in the table; and
  the one or more processors are further collectively operable to communicate a summary of the first table to at least one of the second gateways, the summary comprising the tags from the first table, the scores from the first table, and a plurality of flags, each flag identifying whether an associated score has changed since a previous summary of the first table was communicated to the at least one second gateway.

28. A method, comprising:
  receiving one or more test signals at a first gateway from a second gateway;
  communicating the one or more test signals back to the second gateway; and
  allowing the second gateway to generate a score representing a voice quality supported by the second gateway on a path from the second gateway to the first gateway.

29. The method of claim 28, wherein the one or more test signals comprise one or more first test signals and the score comprises a first score; and
  further comprising:
    generating one or more second test signals at the first gateway;
    communicating the one or more second test signals to the second gateway;
    receiving the one or more second test signals at the first gateway from the second gateway;
    comparing the one or more second test signals to one or more expected signals; and
    generating a second score representing a voice quality supported by the first gateway on the path from the first gateway to the second gateway, the score based at least partially on the comparison.

30. The method of claim 28, wherein the one or more test signals comprise three tones at frequencies of 104 Hertz, 1004 Hertz, and 2804 Hertz.

31. The method of claim 28, wherein the score comprises at least one of an International Telecommunication Union—Telecommunications (ITU-T) Perceptual Speech Quality Measurement (PSQM) score and an ITU-T Perceptual Evaluation of Speech Quality (PESQ) score.

32. The method of claim 28, wherein the second gateway is operable to store the score in a first table; and
further comprising receiving the score from the second gateway and updating a second table with the score.

33. The method of claim 28, wherein:
the first gateway comprises one of a plurality of first gateways and the score comprises a plurality of scores;
the second gateway stores the scores in a first table, the first table also comprising a plurality of tags, each tag associated with one of the scores in the table; and
further comprising:
receiving a summary of the first table at one or more of the first gateways from the second gateway, the summary comprising the tags from the first table, the scores from the first table, and a plurality of flags, each flag identifying whether an associated score has changed since a previous summary of the first table was communicated to the one or more of the first gateways; and
updating a second table at the one or more first gateways with any score having an associated flag showing that the score has changed since the previous summary of the first table was communicated to the one or more first gateways.

34. Logic embodied on at least one computer readable medium and operable when executed to:
receive one or more test signals at a first gateway from a second gateway;
communicate the one or more test signals back to the second gateway; and
allow the second gateway to generate a score representing a voice quality supported by the second gateway on a path from the second gateway to the first gateway.

35. The logic of claim 34, wherein the one or more test signals comprise one or more first test signals and the score comprises a first score; and
the logic is further operable to:
generate one or more second test signals at the first gateway;
communicate the one or more second test signals to the second gateway;
receive the one or more second test signals at the first gateway from the second gateway;
compare the one or more second test signals to one or more expected signals; and
generate a second score representing a voice quality supported by the first gateway on the path from the first gateway to the second gateway, the score based at least partially on the comparison.

36. The logic of claim 34, wherein the one or more test signals comprise three tones at frequencies of 104 Hertz, 1004 Hertz, and 2804 Hertz.

37. The logic of claim 34, wherein the score comprises at least one of an International Telecommunication Union—Telecommunications (ITU-T) Perceptual Speech Quality Measurement (PSQM) score and an ITU-T Perceptual Evaluation of Speech Quality (PESQ) score.

38. The logic of claim 34, wherein:
the second gateway is operable to store the score in a first table; and
the logic is further operable to receive the score from the second gateway and update a second table with the score.

39. The logic of claim 34, wherein:
the first gateway comprises one of a plurality of first gateways and the score comprises a plurality of scores;
the second gateway stores the scores in a first table, the first table also comprising a plurality of tags, each tag associated with one of the scores in the table; and
the logic is further operable to:
receive a summary of the first table at one or more of the first gateways from the second gateway, the summary comprising the tags from the first table, the scores from the first table, and a plurality of flags, each flag identifying whether an associated score has changed since a previous summary of the first table was communicated to the one or more of the first gateways; and
update a second table at the one or more first gateways with any score having an associated flag showing that the score has changed since the previous summary of the first table was communicated to the one or more first gateways.

40. A system, comprising:
one or more processors collectively operable to:
receive one or more test signals at a first gateway from a second gateway;
communicate the one or more test signals back to the second gateway; and
allow the second gateway to generate a score representing a voice quality supported by the second gateway on a path from the second gateway to the first gateway; and
a memory operable to store the score.

41. The system of claim 40, wherein the one or more test signals comprise one or more first test signals and the score comprises a first score; and
the one or more processors are further collectively operable to:
generate one or more second test signals at the first gateway;
communicate the one or more second test signals to the second gateway;
receive the one or more second test signals at the first gateway from the second gateway;
compare the one or more second test signals to one or more expected signals; and
generate a second score representing a voice quality supported by the first gateway on the path from the first gateway to the second gateway, the score based at least partially on the comparison.

42. The system of claim 40, wherein the test signals comprise three tones at frequencies of 104 Hertz, 1004 Hertz, and 2804 Hertz.

43. The system of claim 40, wherein the score comprises at least one of an International Telecommunication Union—Telecommunications (ITU-T) Perceptual Speech Quality Measurement (PSQM) score and an ITU-T Perceptual Evaluation of Speech Quality (PESQ) score.

44. The system of claim 40, wherein:
the second gateway is operable to store the score in a first table; and
the one or more processors are further collectively operable to receive the score from the second gateway and update a second table with the score.

45. The system of claim 40, wherein:
the first gateway comprises one of a plurality of first gateways and the score comprises a plurality of scores;
the second gateway stores the scores in a first table, the first table also comprising a plurality of tags, each tag associated with one of the scores in the table; and the one or more processors are further collectively operable to:
   receive a summary of the first table at one or more of the first gateways from the second gateway, the summary comprising the tags from the first table, the scores from the first table, and a plurality of flags, each flag identifying whether an associated score has changed since a previous summary of the first table was communicated to the one or more of the first gateways; and
   update a second table at the one or more first gateways with any score having an associated flag showing that the score has changed since the previous summary of the first table was communicated to the one or more first gateways.

46. A system, comprising:

a first gateway operable to generate one or more first test signals;

a second gateway operable to receive the one or more first test signals from the first gateway and to communicate the one or more first test signals to the first gateway;

the first gateway also operable to receive the one or more first test signals from the second gateway, compare the one or more first test signals to one or more first expected signals, and generate a first score representing a voice quality supported by the first gateway on a path from the first gateway to the second gateway;

the second gateway also operable to generate one or more second test signals;

the first gateway is further operable to receive the one or more second test signals from the second gateway and to communicate the one or more second test signals to the second gateway;

the second gateway further operable to receive the one or more second test signals, compare the one or more second test signals to one or more second expected signals, and generate a second score representing a voice quality supported by the second gateway on the path from the second gateway to the first gateway; and the first and second gateways further operable to communicate and exchange the first and second scores.

47. A system, comprising:

means for generating one or more test signals at a first gateway;

means for communicating the one or more test signals to a second gateway;

means for receiving the one or more test signals from the second gateway;

means for comparing the one or more test signals to one or more expected signals; and means for generating a score representing a voice quality supported by the first gateway on a path from the first gateway to the second gateway.

* * * * *